(12) United States Patent
Bradfield

(10) Patent No.: US 12,328,058 B2
(45) Date of Patent: Jun. 10, 2025

(54) INTEGRATED STATOR COOLING JACKET SYSTEM

(71) Applicant: BorgWarner Inc., Auburn Hills, MI (US)

(72) Inventor: Michael Duane Bradfield, Anderson, IN (US)

(73) Assignee: BORGWARNER INC., Auburn Hills, MI (US)

( * ) Notice: Subject to any disclaimer, the term of this patent is extended or adjusted under 35 U.S.C. 154(b) by 0 days.

(21) Appl. No.: 18/468,798

(22) Filed: Sep. 18, 2023

(65) Prior Publication Data

US 2024/0006961 A1  Jan. 4, 2024

Related U.S. Application Data

(62) Division of application No. 16/739,264, filed on Jan. 10, 2020, now Pat. No. 11,811,294.

(Continued)

(51) Int. Cl.
*H02K 9/00* (2006.01)
*H02K 1/20* (2006.01)
(Continued)

(52) U.S. Cl.
CPC ............... *H02K 9/00* (2013.01); *H02K 5/203* (2021.01); *H02K 1/20* (2013.01); *H02K 9/19* (2013.01)

(58) Field of Classification Search
CPC .......... H02K 9/19; H02K 9/193; H02K 9/197; H02K 5/20; H02K 5/203; H02K 5/207;
(Continued)

(56) References Cited

U.S. PATENT DOCUMENTS

| 3,299,738 A | 1/1967 | Sand |
| 4,330,726 A | 5/1982 | Albright |

(Continued)

FOREIGN PATENT DOCUMENTS

| CN | 101232211 A | 7/2008 |
| CN | 101790831 A | 7/2010 |

(Continued)

OTHER PUBLICATIONS

International Search Report and Written Opinion mailed May 8, 2020 in PCT/US2020/013073; 10 pages.

(Continued)

*Primary Examiner* — Tulsidas C Patel
*Assistant Examiner* — Robert E Mates
(74) *Attorney, Agent, or Firm* — CANTOR COLBURN LLP

(57) ABSTRACT

An electric machine includes a stator formed from a plurality of stator laminations arranged in a first lamination group and a second lamination group. The first lamination group and the second lamination group form a tortuous flow path that extends across the stator. The first lamination group includes at least two of the plurality of stator laminations joined together. The at least two of the plurality of stator laminations include a first plurality of cooling channel defining members. The second lamination group includes a second plurality of stator teeth and a second plurality of cooling channel defining members. The second plurality of cooling channel defining members of the second lamination group are circumferentially offset from corresponding ones of the first plurality of cooling channel defining members of the first lamination group.

23 Claims, 4 Drawing Sheets

Related U.S. Application Data

(60) Provisional application No. 62/793,215, filed on Jan. 16, 2019.

(51) Int. Cl.
  *H02K 5/20* (2006.01)
  *H02K 9/19* (2006.01)

(58) Field of Classification Search
  CPC .. H02K 3/24; H02K 1/32; H02K 9/00; H02K 9/14; H02K 1/20
  See application file for complete search history.

(56) References Cited

U.S. PATENT DOCUMENTS

| | | | |
|---|---|---|---|
| 4,912,350 | A | 3/1990 | Parshall et al. |
| 5,331,238 | A | 7/1994 | Johnsen |
| 5,666,016 | A | 9/1997 | Cooper |
| 5,682,074 | A | 10/1997 | Di Pietro et al. |
| 5,845,756 | A | 12/1998 | Dairokuno et al. |
| 6,201,365 | B1 | 3/2001 | Hara et al. |
| 6,323,613 | B1 | 11/2001 | Hara et al. |
| 7,102,260 | B2 | 9/2006 | Takenaka et al. |
| 7,633,194 | B2 | 12/2009 | Dawsey |
| 7,749,122 | B2 | 7/2010 | Yoneyama |
| 7,946,118 | B2 | 5/2011 | Hippen et al. |
| 8,201,316 | B2 | 6/2012 | Rippel et al. |
| 8,269,384 | B2 | 9/2012 | Bradfield |
| 8,269,393 | B2 | 9/2012 | Patel et al. |
| 8,378,550 | B2 | 2/2013 | Bradfield |
| 8,395,287 | B2 | 3/2013 | Bradfield |
| 8,427,018 | B2 | 4/2013 | Dutau et al. |
| 8,629,585 | B2 | 1/2014 | Bradfield |
| 8,866,353 | B2 | 10/2014 | Miyama et al. |
| 8,872,399 | B2 | 10/2014 | Chamberlin et al. |
| 9,306,433 | B2 | 4/2016 | Sten et al. |
| 9,903,242 | B2 | 2/2018 | Long et al. |
| 9,960,654 | B2 | 5/2018 | Bradfield |
| 10,333,365 | B2 | 6/2019 | Patel et al. |
| 10,389,211 | B2 | 8/2019 | Bradfield |
| 10,621,541 | B2 | 4/2020 | Andres et al. |
| 11,025,114 | B2 | 6/2021 | Sridharan et al. |
| 11,811,294 | B2 * | 11/2023 | Bradfield ................ H02K 9/00 |
| 2003/0048015 | A1 | 3/2003 | Tornquist et al. |
| 2003/0193256 | A1 | 10/2003 | Liebermann |
| 2004/0045749 | A1 | 3/2004 | Jaura et al. |
| 2006/0284511 | A1 | 12/2006 | Evon et al. |
| 2007/0013241 | A1 | 1/2007 | Schiferl et al. |
| 2008/0100159 | A1 | 5/2008 | Dawsey et al. |
| 2011/0298316 | A1 | 12/2011 | Bradfield |
| 2011/0298317 | A1 | 12/2011 | Bradfield |
| 2011/0298318 | A1 | 12/2011 | Bradfield |
| 2011/0304227 | A1 | 12/2011 | Bradfield |
| 2012/0074799 | A1 | 3/2012 | Bradfield |
| 2012/0080117 | A1 | 4/2012 | Bradfield |
| 2012/0080964 | A1 | 4/2012 | Bradfield |
| 2012/0091834 | A1 | 4/2012 | Bradfield |
| 2013/0049495 | A1 | 2/2013 | Matsuo |
| 2013/0076166 | A1 * | 3/2013 | Chamberlin ........... H02K 5/203 29/596 |
| 2013/0119793 | A1 | 5/2013 | Hofkirchner et al. |
| 2013/0214624 | A1 | 8/2013 | Kubes et al. |
| 2014/0070640 | A1 | 3/2014 | Tolpadi et al. |
| 2015/0076935 | A1 | 3/2015 | Bulatow et al. |
| 2016/0149448 | A1 | 5/2016 | Koenig et al. |
| 2016/0149450 | A1 | 5/2016 | Horii et al. |
| 2016/0211713 | A1 | 7/2016 | Patel et al. |
| 2016/0241093 | A1 | 8/2016 | Patel et al. |
| 2016/0372983 | A1 | 12/2016 | Okochi |
| 2017/0144532 | A1 | 5/2017 | Tokozakura et al. |
| 2019/0291570 | A1 | 9/2019 | Tang et al. |
| 2020/0227977 | A1 | 7/2020 | Bradfield |
| 2020/0389070 | A1 | 12/2020 | Bradfield |
| 2021/0367461 | A1 | 11/2021 | Barti et al. |
| 2022/0239170 | A1 | 7/2022 | Bradfield |
| 2023/0179037 | A1 | 6/2023 | Bradfield |
| 2023/0179049 | A1 | 6/2023 | Fulton et al. |
| 2023/0246499 | A1 | 8/2023 | Sridharan et al. |
| 2024/0005591 | A1 | 1/2024 | Xu et al. |

FOREIGN PATENT DOCUMENTS

| | | |
|---|---|---|
| CN | 102893496 A | 1/2013 |
| CN | 102934328 A | 2/2013 |
| CN | 103155376 A | 6/2013 |
| CN | 103326483 A | 9/2013 |
| CN | 105048662 A | 11/2015 |
| CN | 106716794 A | 5/2017 |
| CN | 207150273 U | 3/2018 |
| CN | 111769674 A | 10/2020 |
| DE | 102015215762 A1 | 2/2017 |
| DE | 102017213960 A1 | 2/2019 |
| JP | 2006033916 A | 2/2006 |
| JP | 2014057507 A | 3/2014 |

OTHER PUBLICATIONS

Chinese Application No. 202080009172.9 filed Jul. 14, 2021; Chinese Office Action dated Oct. 21, 2023; 10 pages.

* cited by examiner

INTEGRATED STATOR COOLING JACKET SYSTEM

CROSS REFERENCE TO RELATED APPLICATION

This application is a divisional of U.S. application Ser. No. 16/739,264, filed Jan. 10, 2020, which claims the benefit of U.S. Provisional Application Ser. No. 62/793,215, filed on Jan. 16, 2019, the contents of which are incorporated by reference herein in its entirety.

BACKGROUND OF THE INVENTION

Exemplary embodiments pertain to the art of electric motors and, more particularly, to an electric motor having an integrated stator cooling system.

During operation, electric motors produce heat. Often times, rotating components of an electric motor may support a fan member that directs a flow of air through internal motor components. The flow of air may help with smaller systems, such as alternators, and systems that are installed in in open areas, such as generators. The flow of air is not always sufficient in high output systems, particularly those installed in closed areas, such as motor vehicle engine compartments.

Electric motors that are employed as prime movers in a motor vehicle typically include a liquid coolant system. The electric motor includes a stator formed from a plurality of stator laminations and a rotor. The liquid cooling system may include an inlet that receives coolant and an outlet that guides coolant to a heat exchange system. The coolant may flow in a jacket arranged radially outwardly of a stator of the electric motor. Specifically, the coolant may flow through small openings in the housing down onto end turns of a stator winding. The coolant runs over the end turns and passes to the outlet. Transferring heat from the end turns to the coolant reduces a portion of an overall heat signature of the electric motor. However, the end turns have a relatively small surface area relative to an overall size of the stator thereby limiting cooling efficiency.

Other systems rely on direct contact between an outer surface of the stator and an inner surface of a motor housing. In some cases, a cooling jacket may be defined at the inner surface of the housing. Heat may flow from the stator, through the housing, into the coolant passing through the cooling jacket. Indirect contact between a coolant and a surface to be cooled limits heat transfer capacity. In other systems, the heat may pass from an outer surface of the stator into coolant flowing through the housing. The outer surface of the stator possess a relatively small surface area when considered in relation to an overall area of the stator laminations. Accordingly, the industry would be receptive to electric motor cooling systems that remove heat from a larger surface area of the stator directly into a coolant to increase cooing efficacy.

BRIEF DESCRIPTION OF THE INVENTION

Disclosed is an electric machine including a housing having an outer surface, an inner surface, a coolant inlet, and a coolant outlet and a stator mounted in the housing. The stator is formed from a plurality of stator laminations arranged in a first lamination group and a second lamination group. The first lamination group and the second lamination group form a tortuous flow path that extends across the stator. The first lamination group includes at least two of the plurality of stator laminations joined together. The at least two of the plurality of stator laminations forming the first lamination group include a first body having a first inner surface section and a first outer surface section. The first inner surface section includes a first plurality of stator teeth. A first plurality of cooling channel defining members is formed with and extend radially outwardly from the first outer surface section. The first plurality of cooling channel defining members are spaced from others of the first plurality of cooling channel defining members by a corresponding gap. The second lamination group includes a second body having a second inner surface section and a second outer surface section. The second inner surface section includes a second plurality of stator teeth. A second plurality of cooling channel defining members is integrally formed with and extend radially outwardly from the second outer surface section. The second plurality of cooling channel defining members of the second lamination group are circumferentially offset from corresponding ones of the first plurality of cooling channel defining members of the first lamination group.

Also disclosed is an electric machine including a housing having an outer surface, an inner surface, a coolant inlet, and a coolant outlet and a stator mounted in the housing. The stator is formed from a plurality of stator laminations arranged in a first lamination group and a second lamination group. The first lamination group and the second lamination group form a tortuous flow path that extends across the stator. The first lamination group includes a first body having a first inner surface section and a first outer surface section. The first inner surface section including a first plurality of stator teeth. A first plurality of cooling channel defining members is integrally formed with and extend radially outwardly from the outer surface section. The first plurality of cooling channel defining members are spaced from others of the first plurality of cooling channel defining members by a corresponding gap. The first plurality of cooling channel defining members have a circumferential width which is at least three times the radial depth. The second lamination group includes a second body having a second inner surface section and a second outer surface section. The second inner surface section includes a second plurality of stator teeth. A second plurality of cooling channel defining members is integrally formed with and extend radially outwardly from the second outer surface section. The second plurality of cooling channel defining members are spaced from others of the second plurality of cooling channel defining members by a corresponding gap. The second plurality of cooling channel defining members are circumferentially offset from the first plurality of cooling channel defining members.

Further disclosed is an electric machine including a housing having an outer surface, an inner surface, at least two coolant inlets extending through the housing, and a coolant outlet. A stator is mounted in the housing. The stator is formed from a plurality of stator laminations arranged in a first lamination group and a second lamination group. The first lamination group and the second lamination group form a tortuous flow path that extends across the stator. The plurality of stator laminations of the first lamination group include a first body having a first inner surface section and a first outer surface section. The first inner surface section includes a first plurality of stator teeth. A first plurality of cooling channel defining members are integrally formed with and extend radially outwardly from the outer surface section. The first plurality of cooling channel defining members being spaced from others of the first plurality of cooling channel defining members by a corresponding gap. The first plurality of cooling channel defining members have a circumferential width which is at least three times the radial depth. The second lamination group includes a second body having a second inner surface section and a second outer surface section. The second inner surface section including a second plurality of stator teeth. A second plurality of cooling channel defining members is integrally formed with and extend radially outwardly from the second outer surface section. The second plurality of cooling channel defining members are spaced from others of the second plurality of cooling channel defining members by a corresponding gap. The second plurality of cooling channel defining members is circumferentially offset from the first plurality of cooling channel defining members.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
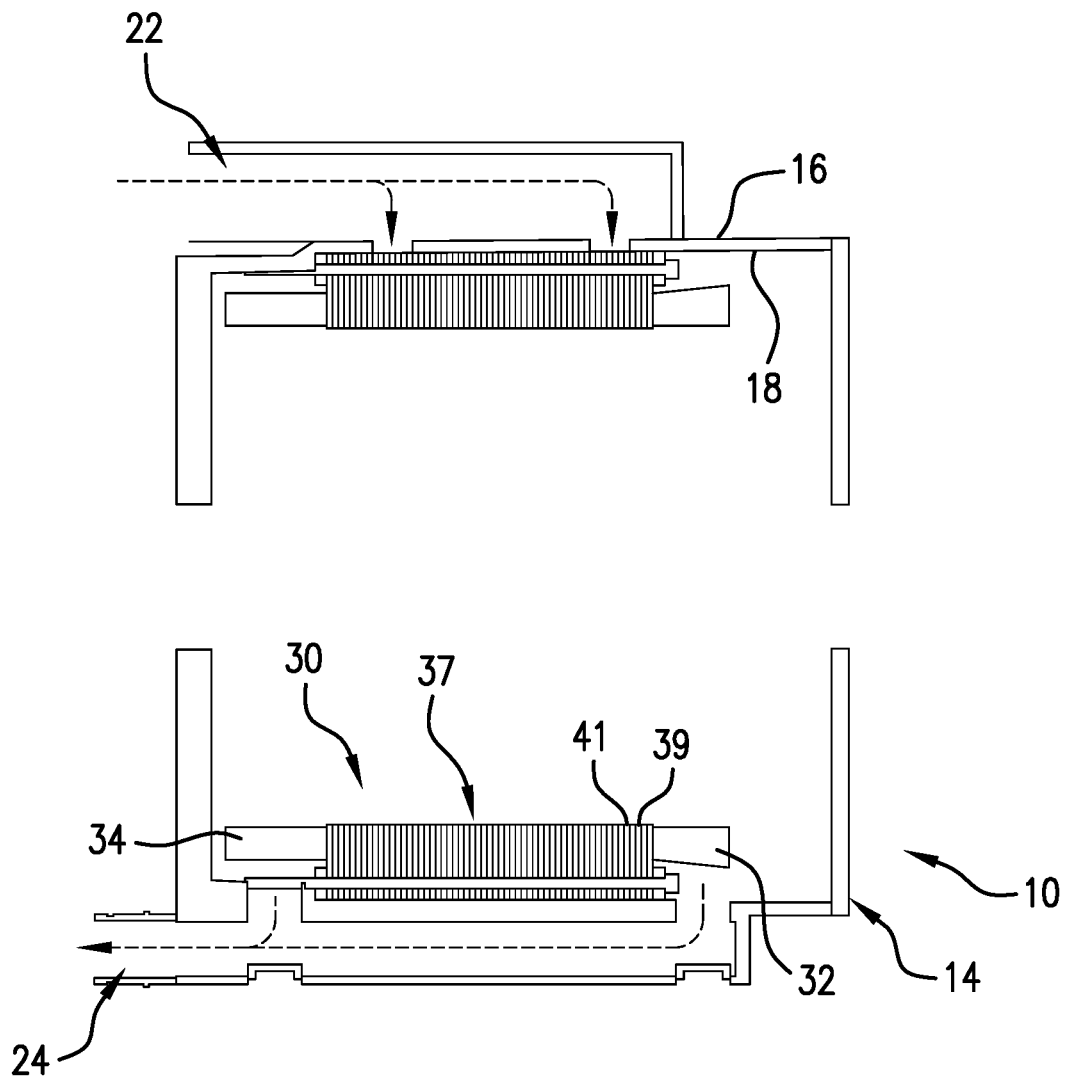
FIG. 1 depicts an electric motor including a stator formed from a plurality of stator laminations, in accordance with an aspect of an exemplary embodiment.

With initial reference to FIG. 1, an electric motor in accordance with an exemplary embodiment, is indicated generally at 10. Electric motor 10 includes a housing 14 having an outer surface 16 and an inner surface 18. Housing 14 also includes a coolant inlet 22 and a coolant outlet 24. The particular location and orientation of coolant inlet 22 and coolant outlet 24 may vary. Electric motor 10 includes a stator 30 arranged in housing 14. Stator 30 is coupled to an end wall (not separately labeled) of housing 14. Stator 30 includes a first end turn 32 and a second end turn 34.

Stator 30 is formed from a plurality of stator laminations 37 as will be detailed more fully herein. Stator laminations 37 are arranged in a plurality of lamination groups including a first lamination group 39 and a second lamination group 41. The number of lamination groups may vary. Second lamination group is radially off-set relative to first lamination group 39. In an embodiment, second lamination group 41 may be radially off-set from first lamination group 39 by about 30°.

Figure 2:
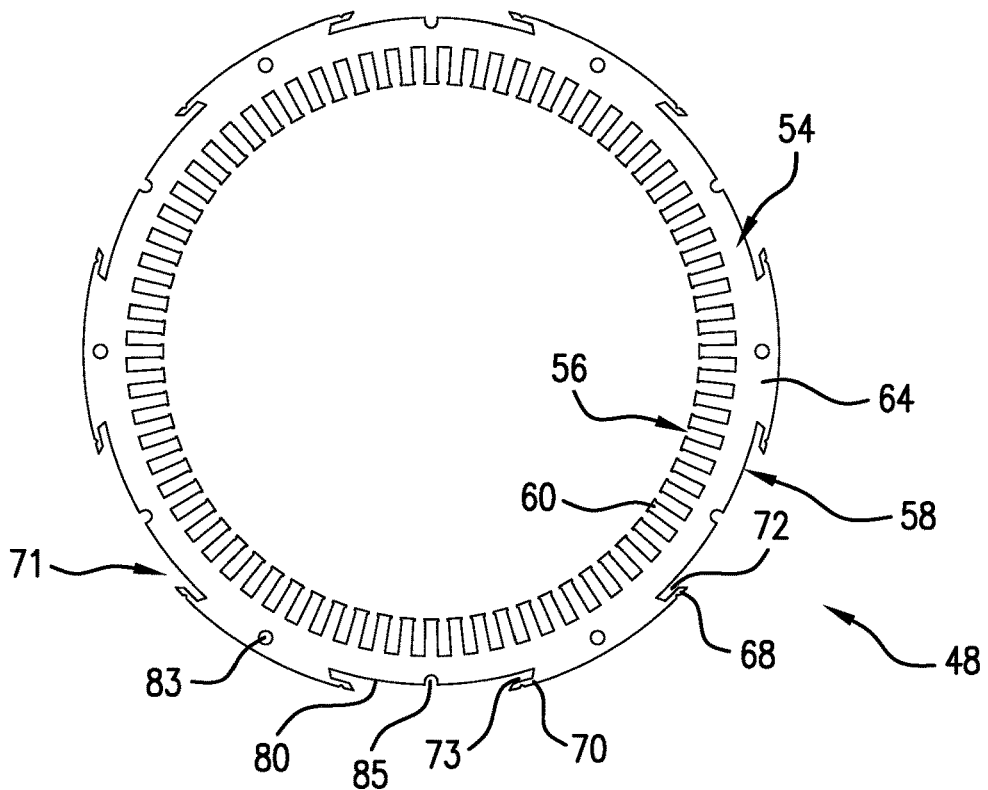
FIG. 2 depicts a stator lamination of the stator of FIG. 1.

Reference will now follow to FIG. 2 in describing a stator lamination 48 that may form part of first lamination group 39. Stator lamination 48 includes a body 54 having an inner surface section 56 and an outer surface section 58. Inner surface section 56 supports a plurality of radially inwardly projecting stator teeth 60. In accordance with an exemplary embodiment, outer surface section 58 supports a plurality of cooling channel defining members, one of which is indicated at 64.

In an embodiment, each cooling channel defining member 64 is radially off-set from an adjacent cooling channel defining member 64 by about 30°. It should be understood that the number of cooling channel defining members may vary as may the off-set between adjacent cooling channel defining members. Further, the offset may be different from or may be substantially the same as the off-set between adjacent lamination groups.

In accordance with an exemplary embodiment, each cooling channel defining member 64 includes a first circumferentially extending portion 68 and a second circumferentially extending portion 70. First circumferentially extending portion 68 is spaced from second circumferentially extending portion 70 by a gap 71. First circumferentially extending portion is also spaced from outer surface section 58 to establish a first cooling channel portion 72 and second circumferentially extending portion 70 is spaced from outer surface section 58 to establish a second cooling channel portion 73. A third cooling channel portion 80 extends between adjacent first circumferentially extending portion 68 and second circumferentially extending portion 70.

Figure 3:
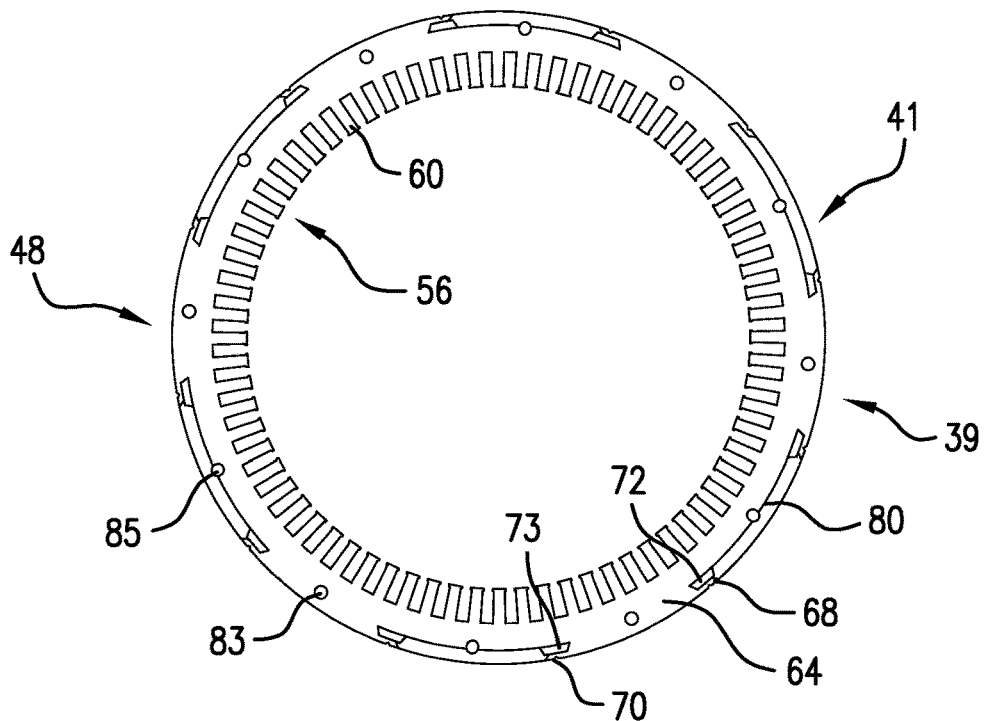
FIG. 3 depicts stator laminations arranged in a first lamination group radially off-set from stator laminations of a second lamination group, in accordance with an aspect of an exemplary embodiment.

Each stator lamination 48 includes an opening 83 formed in each of the plurality of cooling channel defining members 64 and a partial opening 85 formed in third cooling channel portion 80. First and second lamination group 39 and 41 may be offset relative to one another and joined as shown in FIG. 3. In an embodiment, each circumferentially extending portion 68, 70 may include a recess (not separately labeled) on an outer surface portion (also not separately labeled). The recess forms a bonding element receiving zone that may aid in joining stator 30 to inner surface 18 of housing 14.

Figure 4:
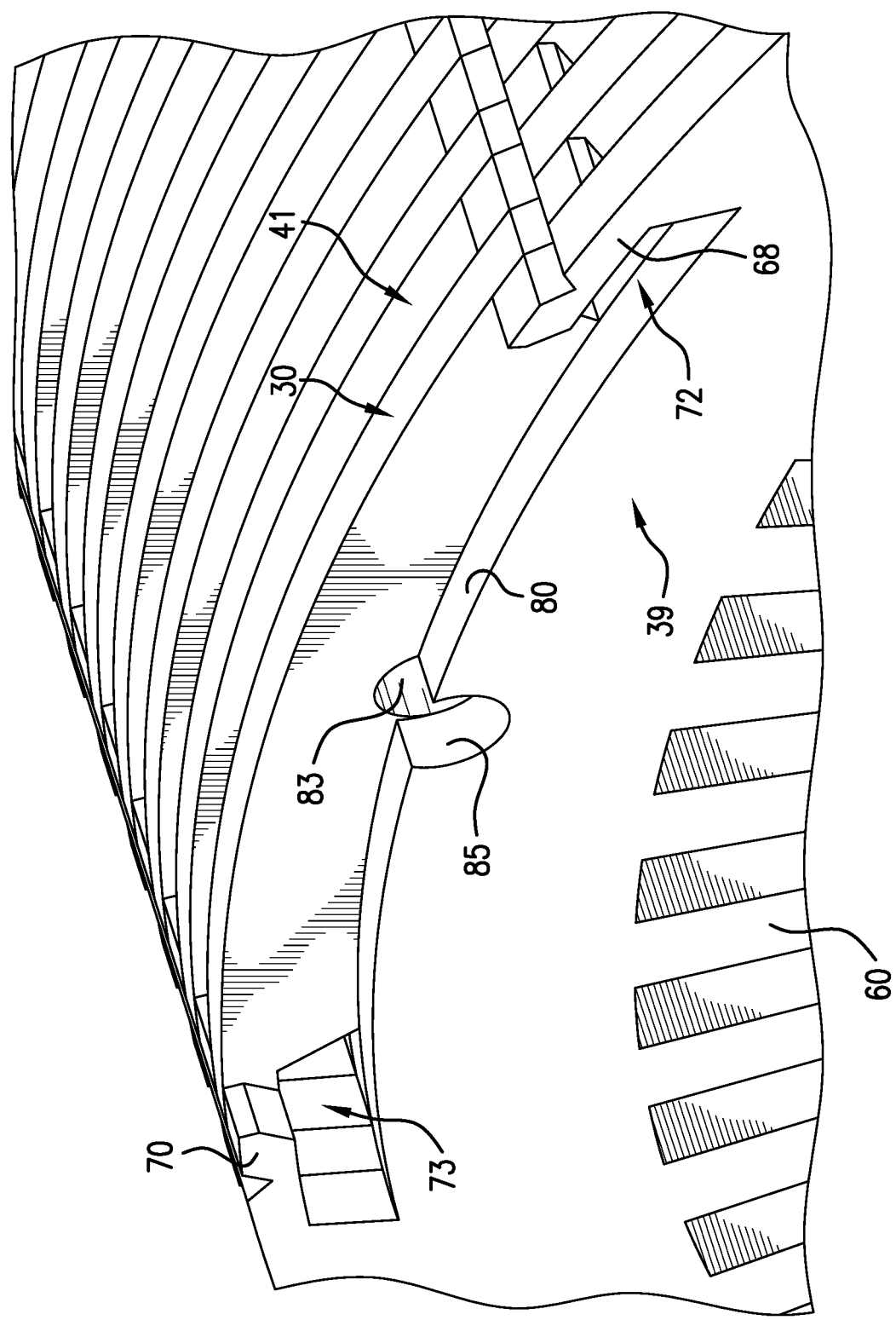
FIG. 4 depicts a serpentine coolant passage formed from a plurality of the stator lamination groups defining the stator of FIG. 1.

In an embodiment, a number of stator laminations, for example six (6) stator laminations, may be joined to form first lamination group 39. Similarly, a number of stator lamination, for example six (6) stator laminations, may be joined to form second lamination group 41. Additional lamination groups may be formed and joined together, each offset relative to another to form stator 30 such as shown in FIG. 4.

Figure 5:
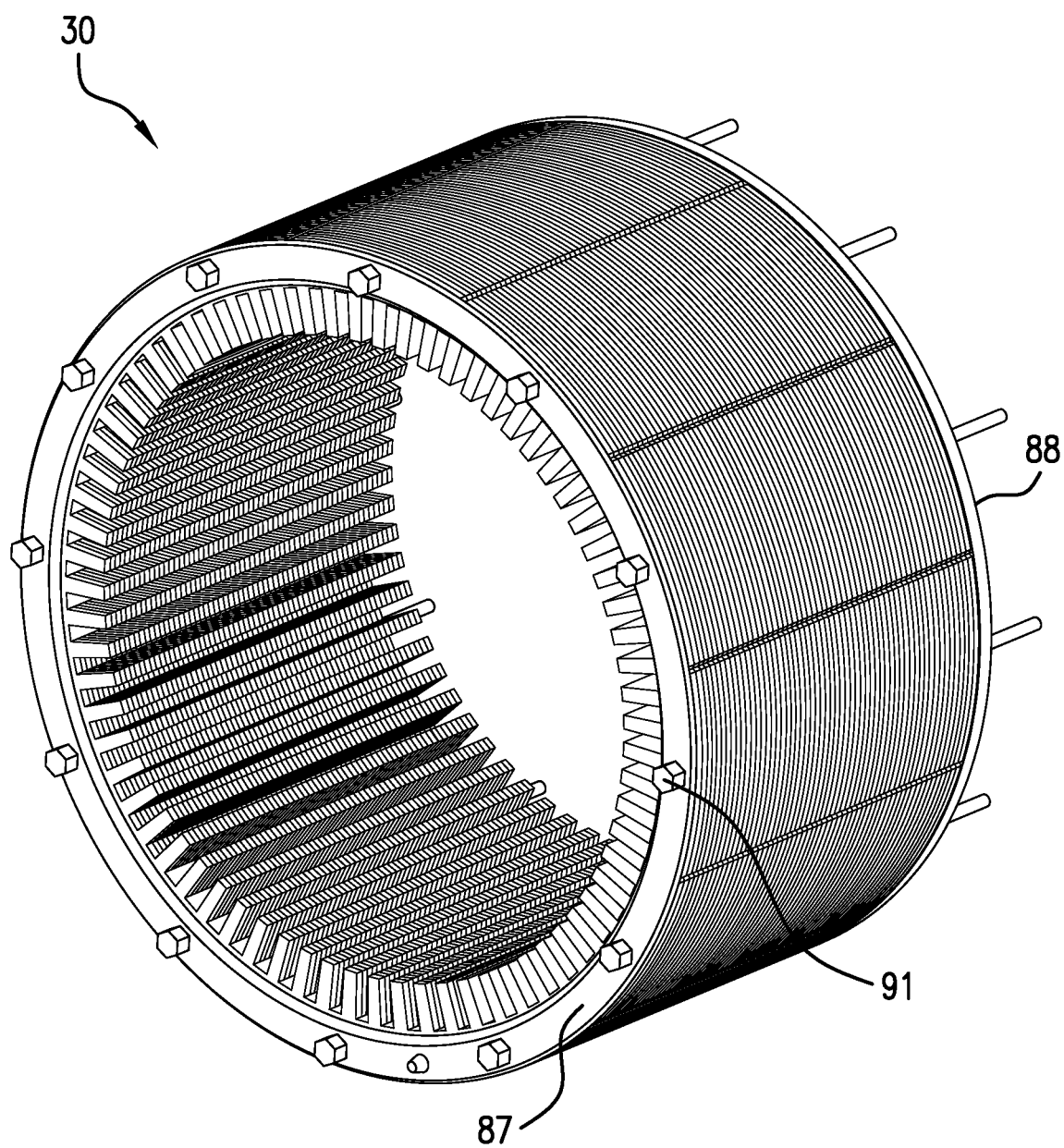
FIG. 5 depicts the stator formed from the stator laminations joined by stator end rings, in accordance with an aspect of an exemplary embodiment.

A first end ring 87 and a second end ring 88 may be installed and laminations connected through a plurality of mechanical fasteners, one of which is indicated at 91 that extend through corresponding ones of openings 83 and partial openings 85 as shown in FIG. 5. In this manner, first, second and third cooling channel portions 72, 73, and 80 may be linked to form a serpentine cooling channel (not separately labeled) that extends axially across stator 30. Cooling fluid may pass through the cooling channel between outer surface section 58 and inner surface 18 of housing 14.

At this point, it should be understood that the exemplary embodiments describe a stator that includes radially outwardly extending projections, each including circumferentially extending portions that create a tortuous or serpentine cooling channel. With this arrangement, additional surface area of the stator laminations is exposed to cooling fluid thereby enhancing heat shedding capacity. The heat shedding capacity may be increased by as much as 50% or greater compared to existing systems. Further, the increased surface area of the stator laminations provides increased flux carrying capacity of the stator that may increase performance by as much as 5%. Thus, not only does the present invention provide additional cooling but also increases an overall operational efficiency of the electric motor.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. An electric machine comprising:
   a housing having an outer surface, an inner surface, a coolant inlet, and a coolant outlet; and
   a stator mounted in the housing, the stator being formed from a plurality of stator laminations arranged in a first lamination group, a second lamination group, and a third lamination group, the first lamination group, the second lamination group, and the third lamination group forming axial flow paths and circumferential flow paths that extend across the stator, the first lamination group comprising:
      at least two of the plurality of stator laminations being joined directly together, the at least two of the plurality of stator laminations forming the first lamination group comprising:
      a first body having a first inner surface section and a first outer surface section, the first inner surface section including a first plurality of stator teeth; and
      a first plurality of axially aligned cooling channel defining members, at least one cooling channel defining member of the first plurality of axially aligned cooling channel defining members being in direct axially aligned contact with another cooling channel defining member of the first plurality of axially aligned cooling channel defining members, the first plurality of axially aligned cooling channel defining members being integrally formed with and extending radially outwardly from the first outer surface section;
   the second lamination group comprising:
      a second body having a second inner surface section and a second outer surface section, the second inner surface section including a second plurality of stator teeth; and
      a second plurality of axially aligned cooling channel defining members, at least one cooling channel defining member of the second plurality of axially aligned cooling channel defining members being in direct axially aligned contact with another cooling channel defining member of the second plurality of axially aligned cooling channel defining members, the second plurality of axially aligned cooling channel defining members being integrally formed with and extending radially outwardly from the second outer surface section, the second plurality of cooling channel defining members of the second lamination group being circumferentially offset from corresponding ones of the first plurality of cooling channel defining members of the first lamination group, and
   the third lamination group comprising:
      third body having a third inner surface section and a third outer surface section, the third inner surface section including a third plurality of stator teeth; and
      a third plurality of axially aligned cooling channel defining members, at least one cooling channel defining member of the third plurality of axially aligned cooling channel defining members being in direct axially aligned contact with another cooling channel defining member of the third plurality of axially aligned cooling channel defining members, the third plurality of axially aligned cooling channel defining members being integrally formed with and extending radially outwardly from the third outer surface section, the third lamination group being circumferentially offset from the second lamination group, the second lamination group creating gap between the plurality of axially aligned cooling channel defining members and the third plurality of axially aligned cooling channel defining members.

2. The electric machine according to claim 1, wherein the at least two of the plurality of stator laminations forming the first lamination group includes less than ten of the plurality of stator laminations.

3. The electric machine according to claim 2, wherein the second lamination group includes less than ten of the plurality of stator laminations.

4. The electric machine according to claim 1, wherein the at least two of the plurality of stator laminations forming the first lamination group includes less than five of the plurality of stator laminations.

5. The electric machine according to claim 4, wherein the second lamination group includes less than five of the plurality of stator laminations.

6. The electric machine according to claim 4, wherein the second lamination group is circumferentially offset relative to the first lamination group.

7. The electric machine according to claim 6, wherein the second lamination group is circumferentially offset by 30° relative to the first lamination group.

8. The electric machine according to claim 2, wherein the first plurality of cooling channel defining members and the second plurality of cooling channel defining members include a circumferential width that is at least 3 times a radial depth of the first plurality of cooling channel defining members and the second plurality of cooling channel defining members.

9. The electric machine according to claim 4, wherein the coolant inlet includes at least two coolant inlets extending through the housing.

10. The electric machine according to claim 1, wherein the second lamination group includes at least two of the plurality of stator laminations joined together.

11. The electric machine according to claim 1, wherein the gap is defined by the second lamination group.

12. An electric machine comprising:
   a housing having an outer surface, an inner surface, a coolant inlet, and a coolant outlet; and
   a stator mounted in the housing, the stator being formed from a plurality of stator laminations arranged in a first lamination group and a second lamination group, the first lamination group and the second lamination group forming a tortuous flow path that extends across the stator, the first lamination group comprising:
   a first body having a first inner surface section and a first outer surface section, the first inner surface section including a first plurality of stator teeth; and
   a first plurality of cooling channel defining members integrally formed with and extending radially outwardly from the first outer surface section, the first plurality of cooling channel defining members being spaced from others of the first plurality of cooling channel defining members by a corresponding gap, wherein the first plurality of cooling channel defining members have a circumferential width which is at least three times a radial depth of the first plurality of cooling channel defining members; and
   the second lamination group comprising:
   a second body having a second inner surface section and a second outer surface section, the second inner surface section including a second plurality of stator teeth; and
   a second plurality of cooling channel defining members integrally formed with and extending radially outwardly from the second outer surface section, the second plurality of cooling channel defining members being spaced from others of the second plurality of cooling channel defining members by a corresponding gap, the second plurality of cooling channel defining members being circumferentially offset from the first plurality of cooling channel defining members.

13. The electric machine of claim 12, wherein the first lamination group includes at least two of the plurality of stator laminations joined together and the second lamination group includes at least two of the plurality of stator laminations joined together.

14. The electric machine according to claim 13, wherein the first lamination group includes less than ten stator laminations joined together.

15. The electric machine according to claim 14, wherein the second lamination group includes less than ten stator laminations joined together.

16. The electric machine according to claim 13, wherein at least two of the plurality of stator laminations are joined together to form a majority of the first and second lamination groups.

17. The electric machine according to claim 16, wherein less than ten of the plurality of stator laminations are joined together to form a majority of the first and second lamination groups.

18. The electric machine according to claim 12, wherein the plurality of stator laminations are connected by mechanical fasteners.

19. The electric machine according to claim 12, wherein the first plurality of cooling channel defining members is circumferentially offset relative to the second plurality of cooling channel defining members by 30°.

20. The electric machine according to claim 12, wherein the coolant inlet comprises at least two coolant inlets extending through the outer surface of the housing.

21. An electric machine comprising:
   a housing having an outer surface, an inner surface, at least two coolant inlets extending through the housing, and a coolant outlet; and
   a stator mounted in the housing, the stator being formed from a plurality of stator laminations arranged in a first lamination group and a second lamination group, the first lamination group and the second lamination group forming a tortuous flow path that extends across the stator, the plurality of stator laminations of the first lamination group comprising:
   a first body having a first inner surface section and a first outer surface section, the first inner surface section including a first plurality of stator teeth; and
   a first plurality of cooling channel defining members integrally formed with and extending radially outwardly from the first outer surface section, the first plurality of cooling channel defining members being spaced from others of the first plurality of cooling channel defining members by a corresponding gap, wherein the first plurality of cooling channel defining members have a circumferential width which is at least three times a radial depth of the first plurality of cooling channel defining members; and
   the second lamination group comprising:
   a second body having a second inner surface section and a second outer surface section, the second inner surface section including a second plurality of stator teeth; and
   a second plurality of cooling channel defining members integrally formed with and extending radially outwardly from the second outer surface section, the second plurality of cooling channel defining members being spaced from others of the second plurality of cooling channel defining members by a corresponding gap, the second plurality of cooling channel defining members being circumferentially offset from the first plurality of cooling channel defining members.

22. The electric machine according to claim 21, wherein the two coolant inlets are axially spaced one from another.

23. The electric machine according to claim 21, wherein the second lamination group includes at least two of the plurality of stator laminations joined together.

* * * * *